United States Patent
Arya et al.

(10) Patent No.: US 12,327,852 B2
(45) Date of Patent: Jun. 10, 2025

(54) COOLING SYSTEM FOR A VEHICLE

(71) Applicant: VOLVO TRUCK CORPORATION, Gothenburg (SE)

(72) Inventors: Pranav Arya, Lindome (SE); Arne Andersson, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/931,580

(22) Filed: Sep. 13, 2022

(65) Prior Publication Data

US 2023/0086299 A1 Mar. 23, 2023

(30) Foreign Application Priority Data

Sep. 22, 2021 (EP) ..................................... 21198270

(51) Int. Cl.
*H01M 10/6568* (2014.01)
*B60L 58/26* (2019.01)
(Continued)

(52) U.S. Cl.
CPC ......... *H01M 10/6568* (2015.04); *B60L 58/26* (2019.02); *B60L 58/33* (2019.02);
(Continued)

(58) Field of Classification Search
CPC ......... H01M 10/6568; H01M 8/04029; H01M 8/04074; H01M 10/613; H01M 10/625;
(Continued)

(56) References Cited

U.S. PATENT DOCUMENTS 9,618,242 B2 * 4/2017 Lombardo ............ F24H 15/208
11,541,721 B2 * 1/2023 Kim .................... B60H 1/00885
(Continued)

FOREIGN PATENT DOCUMENTS

CN 110167772 A 8/2019
DE 102018219203 A1 5/2020
(Continued)

OTHER PUBLICATIONS

Extended European Search Report in corresponding European Application No. 21198270.7 dated Mar. 14, 2022 (9 pages).
(Continued)

*Primary Examiner* — Len Tran
*Assistant Examiner* — Gustavo A Hincapie Serna
(74) *Attorney, Agent, or Firm* — Venable LLP; Jeffri A. Kaminski

(57) ABSTRACT

A cooling system includes a fluid circuit and a cooler arranged in fluid communication with said fluid circuit. The cooler regulates the temperature of said coolant. The fluid circuit comprises a first coolant fluid branch for circulating coolant to regulate a temperature of a low temperature component and a second coolant fluid branch for circulating coolant to regulate a temperature of a high temperature component. A first pump unit is arranged in said first coolant fluid branch. A coolant temperature control system is disposed in said first coolant fluid branch and regulates a temperature of the coolant to the low temperature component on the basis of a temperature difference between a coolant temperature upstream the coolant temperature control system and a temperature required at an inlet of the low temperature component. A second pump unit is arranged in said second coolant fluid branch, and directs coolant to said high temperature component; wherein the second coolant fluid branch intersects with the first coolant fluid branch at
(Continued)

a fluid circuit position downstream the low temperature component.

12 Claims, 5 Drawing Sheets

(51) Int. Cl.
| | | |
|---|---|---|
| *B60L 58/33* | (2019.01) | |
| *H01M 8/04007* | (2016.01) | |
| *H01M 8/04029* | (2016.01) | |
| *H01M 10/613* | (2014.01) | |
| *H01M 10/625* | (2014.01) | |
| *H01M 10/63* | (2014.01) | |

(52) U.S. Cl.
CPC ... *H01M 8/04029* (2013.01); *H01M 8/04074* (2013.01); *H01M 10/613* (2015.04); *H01M 10/625* (2015.04); *H01M 10/63* (2015.04); *H01M 2220/20* (2013.01); *H01M 2250/20* (2013.01)

(58) Field of Classification Search
CPC ............ H01M 10/63; H01M 2220/20; H01M 2250/20; B60L 58/26; B60L 58/33; B60K 2001/005; B60K 11/02
USPC .......................................................... 165/41
See application file for complete search history.

(56) References Cited

U.S. PATENT DOCUMENTS

| | | | | |
|---|---|---|---|---|
| 2004/0050544 A1* | 3/2004 | Hohl | ................ | F01P 7/165 |
| | | | | 62/244 |
| 2005/0133215 A1* | 6/2005 | Ziehr | ................ | B60L 58/27 |
| | | | | 62/238.7 |
| 2009/0007857 A1* | 1/2009 | Esau | ................ | F02B 29/0443 |
| | | | | 165/145 |
| 2011/0296855 A1* | 12/2011 | Johnston | ................ | B60L 50/40 |
| | | | | 62/160 |
| 2012/0225341 A1* | 9/2012 | Major | ................ | B60L 3/003 |
| | | | | 429/120 |
| 2013/0175022 A1* | 7/2013 | King | ................ | B60L 50/62 |
| | | | | 237/12.3 B |
| 2015/0251518 A1* | 9/2015 | Nemesh | ................ | B60H 1/00899 |
| | | | | 62/238.7 |
| 2018/0117981 A1* | 5/2018 | Lacaze | ................ | B62D 55/30 |
| 2018/0178615 A1* | 6/2018 | Xia | ................ | H01M 10/486 |
| 2018/0202697 A1* | 7/2018 | Huenemoerder | ..... | F25B 47/025 |
| 2018/0236842 A1* | 8/2018 | Allgaeuer | ................ | B60H 1/00278 |
| 2018/0281557 A1* | 10/2018 | Park | ................ | B60L 58/26 |
| 2019/0070951 A1* | 3/2019 | Lucke | ................ | H01M 10/625 |
| 2019/0143783 A1 | 5/2019 | He et al. | | |
| 2019/0165387 A1 | 5/2019 | Farnsworth et al. | | |
| 2020/0276882 A1* | 9/2020 | Allgaeuer | ................ | B60H 1/143 |
| 2021/0138867 A1* | 5/2021 | Kim | ................ | B60H 3/024 |
| 2021/0184294 A1* | 6/2021 | MacKenzie | ................ | B60L 58/26 |
| 2021/0188126 A1* | 6/2021 | Unnebäck | ................ | B60L 58/26 |
| 2021/0370747 A1* | 12/2021 | Lee | ................ | F25B 25/005 |
| 2021/0402844 A1* | 12/2021 | Kim | ................ | B60H 1/3227 |
| 2022/0055454 A1* | 2/2022 | Lee | ................ | B60H 1/32284 |
| 2022/0300550 A1* | 9/2022 | Bjornsson | ................ | G06F 3/0488 |
| 2022/0355648 A1* | 11/2022 | Kim | ................ | B60H 1/143 |
| 2023/0070111 A1* | 3/2023 | Jain | ................ | B64D 27/357 |
| 2023/0158883 A1* | 5/2023 | Hall | ................ | F01P 5/10 |
| | | | | 180/68.1 |
| 2023/0322045 A1* | 10/2023 | Hammer | ................ | B60H 1/3229 |
| | | | | 62/132 |

FOREIGN PATENT DOCUMENTS

| | | | |
|---|---|---|---|
| DE | 2021004758 A1 * | 1/2021 | |
| GB | 0625357 D0 | 1/2007 | |
| JP | 2019149352 A | 9/2019 | |
| SE | 1851576 A1 | 6/2020 | |
| WO | 2020185138 A1 | 1/2018 | |
| WO | 2021004758 A1 | 1/2021 | |

OTHER PUBLICATIONS

Chinese Office Action dated Mar. 28, 2025 in corresponding Chinese Patent Application No. 202211078345.X, 15 pages.

* cited by examiner

COOLING SYSTEM FOR A VEHICLE

TECHNICAL FIELD

The disclosure relates to a cooling system for a vehicle, in particular an electric vehicle. The disclosure also relates to a vehicle comprising such a cooling system, e.g. an electric vehicle comprising such a cooling system. The disclosure can typically be applied in vehicle comprising a fuel cell system used as a part of an electric driveline in heavy-duty vehicles, such as trucks, buses and construction equipment. Although the disclosure will be described with respect to an electric truck, the disclosure is not restricted to this particular vehicle, but may also be used in other vehicles such as working machines, buses, cars etc. Additionally, the disclosure may be used in other vehicles such as hybrid vehicles.

BACKGROUND

In the field of electric vehicles, e.g. electric-powered trucks, there is an increasing interest in further improving the efficiency of handling heat generated in e.g. the fuel cells during operation of the fuel cell system. In connections with these types of vehicles, efficient temperature control of any heat generating components such as the fuel cell stack and battery system is central to provide a reliable operation in an ordinary use of the vehicle. In addition, many types of heat generating components in vehicles may require to be operated within their specified operating range. In other words, thermal management for electric vehicle components are central to the performance and longevity of the systems of the vehicle, partly as an efficient thermal management system will enable electric vehicles to drive greater distances.

By way of example, the fuel cell system generally includes a cooling system with the purpose of maintaining the operating temperature of the fuel cell stack at its optimal temperature. While the cooling system can be designed in several different ways, the cooling system for vehicles using high power fuel cell stacks is generally provided in the form of a liquid cooling system, partly because the heat transfer coefficients for liquid flow are typically higher compared to air flow.

Further, in these types of vehicles, there is also an increasing interest in managing cooling of other vehicle heat generating components in order to e.g. provide an efficient operation of the vehicle and a reliable traction using the electric powertrain system. Such components may relate to the brake system, such as the braking resistor.

While cooling systems are known which are designed to manage various types of cooling desired for a vehicle, as for example in WO 2020/185138 A1, there is still a demand to develop a cooling system, which is designed for the cooling of various types of heat generating components in an electric vehicle, such as a fuel cell stack and a braking resistor, in order to further improve the cooling and at least maintain the operational performance of the vehicle.

SUMMARY

An object of the invention is to provide an efficient, yet simple and dynamic cooling system for an electric vehicle.

An object of the disclosure is to provide a cooling system for a vehicle. The cooling system comprises a fluid circuit configured to define a fluid passageway for circulating a coolant there through and a cooler arranged in fluid communication with the fluid circuit. The cooler is configured to regulate the temperature of the coolant. The fluid circuit comprises a first coolant fluid branch for circulating coolant to regulate a temperature of a low temperature component disposed in the first coolant fluid branch and a second coolant fluid branch for circulating coolant to regulate a temperature of a high temperature component disposed in the second coolant fluid branch. The cooling system further comprises a first pump unit arranged in the first coolant fluid branch and in fluid communication with the cooler and the low temperature component; a coolant temperature control system disposed in the first coolant fluid branch and upstream the low temperature component, wherein the coolant temperature control system is configured to regulate a temperature of the coolant to the low temperature component on the basis of a temperature difference between a coolant temperature upstream the coolant temperature control system and a temperature required at an inlet of the low temperature component; a second pump unit arranged in the second coolant fluid branch and in fluid communication with the cooler and the high temperature component, the second pump unit being configured to direct coolant to the high temperature component. Moreover, the second coolant fluid branch intersects with the first coolant fluid branch at a fluid circuit position downstream the low temperature component so that coolant from the second coolant fluid branch is allowed to blend with coolant from the first coolant fluid branch before returning to the cooler via a return flow path.

The disclosure is at least partly based on the insight that current cooling systems arranged to provide coolant to more than one component, such as a low temperature component in the form of a fuel cell stack and a high temperature component in the form of a brake resistor/brake retarder, suffer from a reliable operation during all vehicle operating conditions. By way of example, heavy-duty electric vehicle may often be subject to braking/retardation for long periods, while driving downhill along a route. In electric vehicles this braking/retardation may generally be carried out by braking using an electric machine which generates power and subsequently charges the batteries of the vehicle. If the braking/retardation periods are long-lasting and extensive, the batteries will eventually become fully charged and cannot no longer provide the required braking effect. In such cases, the brake system may activate or operate a brake resistor which is configured to handle the excessive generated heat once the batteries are fully charged. The resistor is heated up using the power produced from the electric machines. For thermal management reasons, the brake resistors need to be cooled during operation of the vehicle. However, there may be a downside to arrange the brake resistors in the main fluid circuit with other vehicle components as some of the other vehicle components in the main cooling circuit may be more sensitive to high temperatures. One example of such sensitive vehicle component is the fuel cell stack of the fuel cell system. One common system to provide a reliable thermal management of the components is thus to arrange the brake resistor in a separate cooling system than the fuel cell stack or control the brake resistor to operate at a lower temperature that compromises the effectiveness of the cooling system.

In addition, the fuel cell system may typically have limitations in the form of possible number of starts and stops. Therefore, the fuel cell system should favorably be operated so as to avoid a complete shutdown of fuel cell system during the braking event. As such, there is generally an additional need of cooling of systems including both a fuel cell system and a brake resistor. A similar challenge may arise for other combinations of low and high temperature components.

In view of the above, the proposed cooling system provides a more reliable, yet efficient and simple arrangement of having low and high temperature components in a common cooling system, in which there is provided a coolant temperature control system to regulate a temperature of the coolant to the low temperature component on the basis of a temperature difference between an upstream coolant temperature and a coolant temperature required at an inlet of the low temperature component. By the arrangement and configuration of the coolant temperature control system, it becomes possible to add a high temperature component, such as the brake resistor, to one of the fluid branches of the main cooling circuit and allow it to operate at elevated temperatures (thus operating with a higher effectiveness), while maintaining a lower temperature in the temperature sensitive component to operate it safely. Thereby, the cooling system is allowed to reject more heat from the cooler, such as the front radiator of the vehicle.

It should be noted that the proposed cooling system can be extended to and/or used with other types of combinations of vehicle temperature components where there is a desire to arrange components in the cooling circuit that can operate at different temperatures and thereby allowing to increase the effectiveness of the heat rejection to the ambient environment by increasing the temperature of the coolant in the cooler (such as the front radiator of the vehicle).

In particular, by determining the temperature of the supplied coolant that is upstream the coolant temperature control system and the temperature of the coolant that is desired at the inlet of the low temperature component, the proposed coolant temperature control system determines a needed temperature difference for controlling the coolant temperature in the first fluid branch so as to maintain the temperature of the low temperature component, i.e. a more temperature sensitive vehicle component, such as a fuel cell stack, at a safe level during the operation of the vehicle, and without compromising the cooling of the high temperature component in the second branch. Accordingly, by the provision of having the coolant temperature control system in the first coolant fluid branch in-between the first pump unit and the low temperature component that is configured to regulate the temperature of the coolant to the low temperature component, it becomes possible to supply coolant to the sensitive low temperature component, e.g. the fuel cell stack, so as to maintain the temperature at a safe level during operation of the vehicle. To this end, the coolant temperature control system is configured to control the supply of coolant based on the temperature of the coolant entering the low temperature component and the temperature of the coolant after the cooler, so as to provide an improved thermal management system. This may be particularly useful for certain applications of the system, such as the implementation of the system in a vehicle having a fuel cell system where a precis control of the temperature may be required in order to extend the durability of the fuel cell system. From a more general system perspective, the increased effectiveness of the cooling system may allow for using a smaller radiator at the front of the vehicle. Since the frontal area of e.g. a truck is rather limited, the proposed system may thus also allow for an improved cooling system without any adverse effects such as increased aerodynamic resistance (drag).

Further, by the provision of having the second coolant fluid branch to intersect with the first coolant fluid branch at a fluid circuit position downstream the low temperature component, there is provided a cooling system in which the coolant in the fluid circuit can reject more heat to the ambient environment at the cooler due to the increased temperature generated from the high temperature component. In other words, the proposed cooling system allows for increasing the temperature of the coolant before it returns to the cooler, therefore allows for a higher heat rejection to the ambient environment, thereby increasing the effectiveness.

The first pump unit can be disposed at several different position in the first coolant fluid branch. By way of example, the first pump unit is arranged upstream the low temperature component. In addition, or alternatively, the first pump unit is arranged upstream the coolant temperature control system.

Typically, the first pump unit may be arranged downstream of the cooler in the first coolant fluid branch and in fluid communication with the cooler and the low temperature component. Moreover, the first pump unit may generally be configured to direct coolant to the low temperature component. In this example, the coolant temperature control system may generally be disposed in the first coolant fluid branch in-between the first pump unit and the low temperature component.

However, the first pump unit may also be arranged downstream the low temperature component in the first coolant fluid branch.

In a similar vein, the second pump unit may generally be arranged downstream of the cooler in the second coolant fluid branch and in fluid communication with the cooler and the high temperature component. The second pump unit may be arranged in-between the cooler and the high temperature component.

The coolant temperature control system can be provided in several different manners, as will be further described herein. In one example embodiment, the coolant temperature control system may comprise a controllable selection valve in fluid communication with the first pump unit and configured to selectively regulate the flow of coolant to the low temperature component via a primary flow path or to a coolant buffer tank disposed in a secondary flow path. As such, the primary flow path and the secondary flow path form a parallel flow path arrangement. In addition, the coolant buffer tank is adapted to receive and store coolant and further arranged to supply coolant to the low temperature component. Moreover, the controllable selection valve is operable on the basis of the temperature difference and a temperature of the coolant in the coolant buffer tank. By way of example, the controllable selection valve is a three-way valve arrangement. One advantage with a coolant temperature control system using a coolant buffer tank is that the coolant buffer tank allows for an improved control of the temperature entering the low temperature component. Further, by controlling the flow of coolant from the coolant buffer tank based on the determined temperature difference, the required flow of coolant tot eh low temperature component can be provided in an easy manner. Secondly, it may be possible to refill the coolant buffer tank in a separate fashion. As such, it becomes possible to provide a higher cooling capacity in the form of a buffer compared to other prior art systems.

As such, in one example embodiment, the coolant temperature control system comprises the coolant buffer tank and the first coolant fluid branch comprises the primary flow path and the secondary flow path forming the parallel flow path arrangement, wherein the coolant buffer tank is disposed in the secondary flow path. The coolant buffer tank is further arranged in fluid communication with the low temperature component. As such, the coolant buffer tank is arranged downstream the cooler and upstream the low temperature component.

The cooling system may further comprise a third pump unit arranged downstream the coolant buffer tank in the secondary flow path. The third pump unit may be configured to direct coolant from the coolant buffer tank to the low temperature component.

The coolant temperature control system may further be adapted to control a temperature of the stored coolant in the coolant buffer tank to a lower temperature than the temperature of the coolant upstream the coolant temperature control system. In other words, the coolant temperature control system provides for accumulating hot coolant, reduce the temperature of the coolant and subsequently supply a colder coolant to the low temperature component than the temperature of the coolant upstream the coolant temperature control system.

By the arrangement of the coolant temperature control system comprising the arrangement of the coolant buffer tank, it becomes possible to build up a buffer of cooled coolant in the coolant buffer tank, which can be used to improve cooling of the low temperature component, such as the fuel cell stack (or other device to be cooled) during high-load situations. During normal or low-load operation of the vehicle, and thus low-load operation of the fuel cell stack (i.e. the low temperature component), the cooling buffer tank may be disconnected from the first fluid circuit branch and the buffer of cooled coolant can be built up again.

The temperature of the stored coolant in the coolant buffer tank may be regulated by any one of a refrigeration circuit and a secondary heat exchanger in fluid communication with the coolant buffer tank.

In one example embodiment, the coolant temperature control system may comprise any one of a refrigeration circuit and a secondary heat exchanger in direct fluid communication with the low temperature component.

The cooling system may comprise a control unit in communication with the coolant temperature control system. The control unit may comprise a processing circuitry for operating the coolant temperature control system.

Typically, the control unit may also control the cooling system by controlling the coolant flow control system. However, the cooling system can be controlled in several different manners, as mentioned above. The coolant temperature control system and the cooling system may typically be controlled by a control unit, such as an ECU of the vehicle or any other control unit of the vehicle such as a control unit of the fuel cell system. The control unit may include a microprocessor, microcontroller, programmable digital signal processor or another programmable device. Thus, the control unit typically comprises electronic circuits and connections as well as processing circuitry such that the control unit can communicate with different parts of the cooling system, the fuel cell system such as the fuel cell stack, cooler, heat exchanger, radiator, pumps, valves, temperature sensors or any other component of the vehicle in order to provide the functions of the example embodiments. The control unit may comprise modules in either hardware or software, or partially in hardware or software and communicate using known transmission buses such as CAN-bus and/or wireless communication capabilities. The processing circuitry may be a general purpose processor or a specific processor. The control unit typically comprises a non-transistory memory for storing computer program code and data upon. Thus, the control unit may be embodied by many different constructions.

In other words, the control functionality of the example embodiments of the proposed cooling system and coolant temperature control system may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. While the example embodiments of the system described above includes a control unit being an integral part thereof, it is also possible that the control unit may be a separate part of the vehicle, and/or arranged remote from the system and in communication with the system.

Generally, the temperature difference between the coolant temperature upstream the coolant temperature control system and the temperature required at an inlet of the low temperature component may be determined by the control unit. Thus, the control unit is configured to determine the temperature difference. The control unit is then configured to transfer data indicative of the determined temperature difference to the coolant temperature control system. In addition, or alternatively, the temperature difference between the coolant temperature upstream the coolant temperature control system and the temperature required at an inlet of the low temperature component may be determined directly by the coolant temperature control system. Accordingly, the coolant temperature control system may comprise a corresponding processing circuitry. In addition, or alternatively, the temperature difference between the coolant temperature upstream the coolant temperature control system and the temperature required at an inlet of the low temperature component may be determined partly by the control unit and partly by the coolant temperature control system. By way of example, the coolant temperature upstream the coolant temperature control system may be measured by a temperature sensor arranged in the first coolant circuit and upstream the coolant temperature control system in the first coolant circuit. The temperature sensor may be in communication with the coolant temperature control system. In addition, or alternatively, the temperature sensor may be in communication with the control unit, which then transfer the value of the determined temperature to the coolant temperature control system. Hence, any one of the coolant temperature control system and the control unit may be configured to receive data indicative of the coolant temperature upstream the coolant temperature control system. The coolant temperature upstream the coolant temperature control system may also be determined in other ways depending on the type of cooling system.

The temperature required at the inlet of the low temperature component may be determined by the control unit and/or by the coolant temperature control system, e.g. by means of temperature data relating to the operational characteristics of the low temperature component. Such temperature data may be supplied to the control unit and/or the coolant temperature control system. In addition, or alternatively, such temperature data of the temperature required at the inlet of the low temperature component may be stored in a memory of the processing circuitry. By way of example, such temperature data may be received from a conventional look-up table stored in the memory.

The cooling system may further comprise a controllable first valve arrangement disposed downstream the cooler for controlling the supply of coolant in the fluid circuit to the first and second coolant fluid branches. Typically, an outlet of the cooler may be adapted to be in fluid communication with an inlet of the first coolant fluid branch and an inlet of the second coolant fluid branch by means of the first valve arrangement. By way of example, the first valve arrangement is a three-way valve.

The cooling system may further comprise a controllable second valve arrangement disposed upstream the cooler for controlling the return of coolant from the first and second coolant fluid branches to the cooler. Typically, an inlet of the cooler may be adapted to be in fluid communication with an outlet of the first coolant fluid branch and an outlet of the second coolant fluid branch by means of the second valve arrangement. By way of example, the second valve arrangement is a three-way valve.

While the proposed cooling system may operate in an efficient manner for various temperature differences between the low temperature component and the high temperature component, it should be noted that the temperature difference may typically be greater than 10 degrees C., still preferably greater than 15 degrees C., still preferably greater than 25 degrees C. By way of example, the temperature difference between the high temperature component and the low temperature component amounts to a temperature difference of more than 15 degrees C.

The term "temperature component" generally refers to a vehicle component that generates thermal energy or heat, e.g. during an operational state of the vehicle. This type of vehicle component typically needs to be cooled in order to guarantee its function in the vehicle. The temperature component is located on or in the vehicle. Examples of temperature components are battery packs, brake resistors, brake retarders, electronic devices, electronic circuits, fuel cell stack comprising fuel cells, inverters, including power inverters, i.e. devices that use the battery pack to power electrical appliances, electric motors, DC/DC converters, on-board chargers, hydraulic components, charge air coolers (cac), air conditioning systems etc.

Moreover, the low temperature component may refer to a component having a maximum permissible temperature. The maximum permissible temperature of the low temperature component may generally refer to a maximum operating temperature of the component. Analogously, the high temperature component may refer to a component having another maximum permissible temperature. The maximum permissible temperature of the high temperature component may generally refer to a maximum operating temperature of the component. In addition, the maximum permissible temperature of the low temperature component may typically be lower than the maximum permissible temperature of the high temperature component. Accordingly, the terms "low" and "high" as used in the context of the temperature components refer to a difference in the maximum permissible temperature of the low and high temperature components.

By way of example, the high temperature component may be any one of a brake resistor, a brake retarder configured to generate heat from a braking event, fuel cell stack and a fuel cell system.

By way of example, the low temperature component may be any one of a battery pack, an electric machine, a fuel cell stack and an inverter.

In one example embodiment, the low temperature component is an electric machine and the high temperature component is a fuel cell stack.

In one example embodiment, the low temperature component is the fuel cell stack and the high temperature component is any one of the brake resistor and brake retarded. Hence, by way of example, the low temperature component is the fuel cell stack, whilst the high temperature component is the brake resistor. Other examples of components and combinations of components may be readily conceivable for other systems. Accordingly, the components are denoted as low and high temperature components based on their relative maximum permissible temperature. That is, the fuel cell stack is a low temperature component when used in combination with the brake resistor, while the fuel cell stack is a high temperature component when used in combination with the electric machine.

Typically, the cooler may be configured to reduce the temperature of a portion of the coolant to a reduced temperature and to supply the portion of coolant to the low temperature component via the first temperature fluid branch of the fluid circuit. The cooler may also be configured to decrease the temperature of another portion of the coolant to the reduced temperature and to supply the portion of coolant to the high temperature component via the second temperature fluid branch of the fluid circuit.

By way of example, the cooler is a heat exchanger, e.g. a radiator. The cooler may be adapted to at least transfer thermal energy from one medium to another for the purpose of cooling the coolant supplied to it. The cooler may use air for cooling of the coolant and may be arranged at the front of a vehicle in a vehicle application. A fan for creating a forced air flow may be arranged in association with the cooler to increase heat exchange efficiency.

Generally, each one of the pump units may be configured to control a flow rate and pressure of the fluid supplied there through. Each one of the pumps are generally provided as conventional fluid pumps configured to be controllable by a control signal from the control unit.

Typically, although not strictly required, the fluid circuit is formed by the first coolant branch, the second coolant branch and the return flow path. While the proposed cooling system comprises the arrangement of the first coolant branch and the second coolant branch intersecting into the return flow path, the fluid circuit may in some example embodiments comprise additional fluid passages and/or coolant branches for additional vehicle temperature components. The number of temperature components may generally depend on the configuration of the cooling system and the number of components.

According to a second aspect of the present disclosure, there is provided a vehicle, preferably an electric vehicle, which comprises a cooling system according to any one of the example embodiments and/or the features as described above in relation to the first aspect of the present disclosure.

Effects and features of the second aspect are largely analogous to those described above in relation to the first aspect of the present disclosure.

Further advantages and advantageous features of the disclosure are disclosed in the following description and in the dependent claims. It should also be readily appreciated that different features may be combined to create embodiments other than those described in the following, without departing from the scope of the present disclosure.

The terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

BRIEF DESCRIPTION OF THE DRAWINGS

The above, as well as additional objects, features and advantages of the present disclosure, will be better understood through the following illustrative and non-limiting detailed description of exemplary embodiments of the present disclosure, wherein.

DETAILED DESCRIPTION OF EXAMPLE EMBODIMENTS OF THE DISCLOSURE

Figure 1:
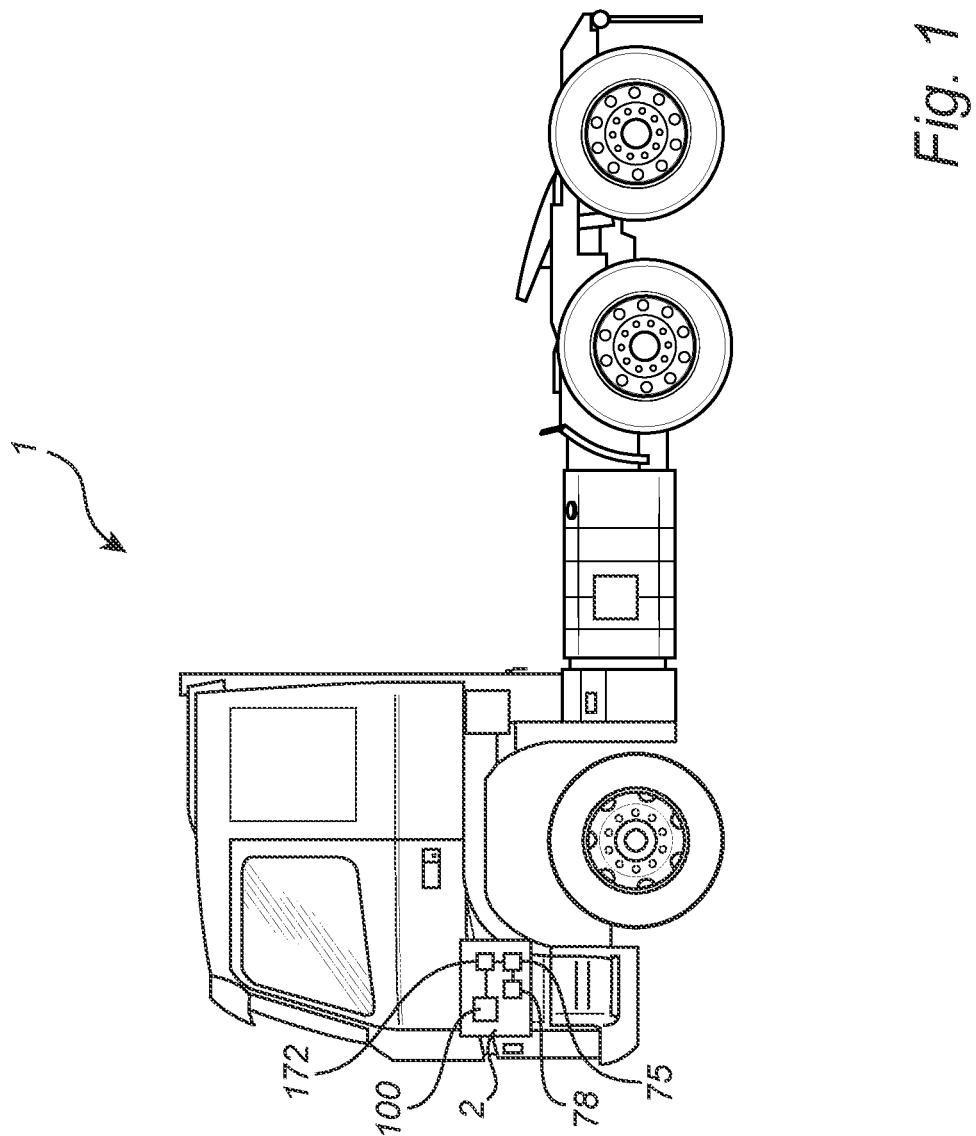
FIG. 1 is a side view of a vehicle comprising a cooling system according to an example embodiment of the present disclosure.

The present disclosure will now be described more fully hereinafter with reference to the accompanying drawings, in which an exemplary embodiment of the disclosure is shown. The disclosure may, however, be embodied in many different forms and should not be construed as limited to the embodiment set forth herein; rather, the embodiment is provided for thoroughness and completeness. Like reference character refer to like elements throughout the description.

With particular reference to FIG. 1, there is provided a vehicle 1 in the form of a fuel cell electric vehicle (FCEV) comprising a power/energy supply unit in the form of a fuel cell stack comprising a drive unit in the form of a fuel cell stack 172 and a cooling system 100 in fluid communication with the fuel cell stack 172. The cooling system 100 and the fuel cell stack are integral parts of a vehicle system 2. In the following FIGS. 2 to 5, a number of examples of a system 2 comprising the cooling system 100 will be described. The vehicle 1 depicted in FIG. 1 is a truck for which the system 2, the cooling system 100 and the fuel cell stack 172, which will be described in detail below, is particularly suitable for.

The fuel cell stack 172 is generally an integral part of a fuel cell system in communication with the cooling system 100. The fuel cell stack is configured and arranged to generate electricity to propel the vehicle 1 and, optionally, to power auxiliary equipment. In the FCEV 1, hydrogen fuel is consumed in the fuel cell stack 172 of the fuel cell system to produce electricity, with water (or water vapor) and heat as the major by-products. The FCEV 1 illustrated in FIG. 1 may be configured in a series hybrid design where the fuel cell system is paired with a battery system 78. The battery system is here a high voltage battery system 78.

Besides the fuel cell stack 172, the FCEV 1 generally comprises an electric powertrain having one or more electric machines 75 connected to the fuel cell stack 172 and the battery system 78. The electric machine is a drive unit of the of the vehicle, while the fuel cell system including the fuel cell stack is the energy provider to the electric machine. Traction power to the vehicle is thus delivered by the battery pack 78, the fuel cell stack 172 and the electric machine. By way of example, the battery pack 78 is connected via converters to the electric machine 75 that moves the vehicle, while the fuel cell system supplies energy to the electric machine 75 and/or delivers power to the battery system 78. In other words, a typical FCEV may also use traction batteries or capacitors, inverters, and electric motors for providing traction power to the vehicle. The FCEV may also include other components as is commonly known in the field of fuel cell systems, and thus not further described herein.

Figure 2:
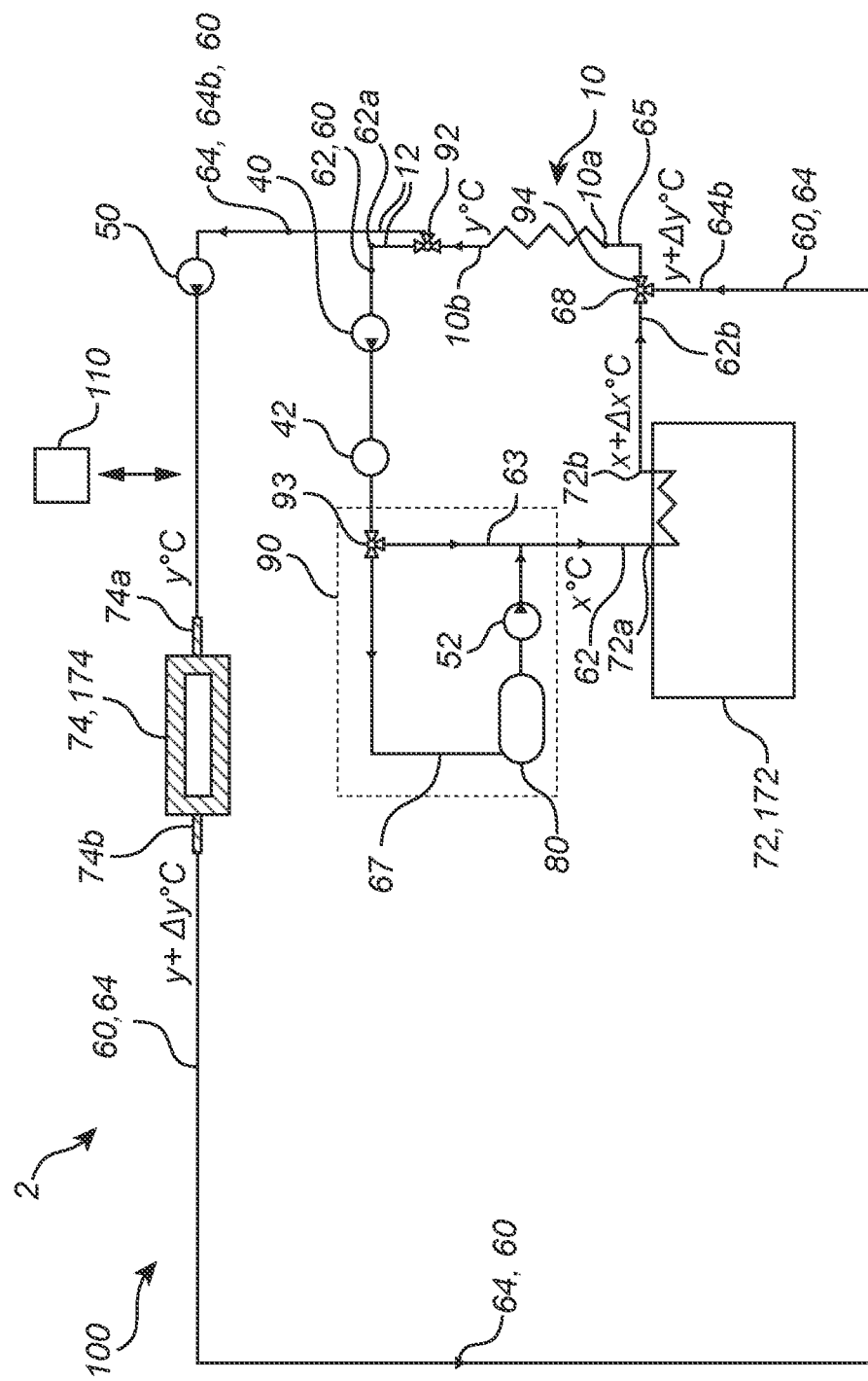
FIG. 2 schematically illustrates parts of a vehicle system comprising a cooling system according to an example embodiment of the present disclosure, in which the cooling system can be incorporated in the vehicle illustrated in FIG. 1.

The cooling system 100 and further components of the system 2 are described in more detail below with reference to FIGS. 2-5. Turning now to FIG. 2, there is depicted an example of the system 2 comprising the cooling system 100. As illustrated in FIG. 2, the cooling system comprising a fluid circuit 60. The fluid circuit 60 is arranged and configured to contain a coolant 12. The fluid circuit is thus configured to define a fluid passageway for circulating the coolant there through. The circulation of coolant is generally made possible by one or more fluid pump units 40 and 50, as further described hereinafter.

In addition, the cooling system 100 comprises a cooler 10. By way of example, the cooler 10 is a heat exchanger, e.g. a radiator. The cooler 10 is adapted to at least transfer thermal energy from one fluid medium to another fluid medium for the purpose of cooling the coolant supplied to it. The heat exchanger should be dimensioned in view of the desired function for the specific vehicle as well as the available space and installation in the vehicle. Radiators can be provided in several different ways and are commercially available in various configurations.

The cooler 10 is arranged in fluid communication with the fluid circuit 60, as shown in FIG. 2. Further, the cooler 10 is configured to regulate the temperature of the coolant.

As illustrated in FIG. 2, the fluid circuit 60 comprises a first coolant fluid branch 62 for circulating coolant 12 to regulate a temperature of a low temperature component 72 disposed in the first coolant fluid branch. In this example, the low temperature component is the the fuel cell stack 172.

In addition, as illustrated in FIG. 2, the fluid circuit 60 comprises a second coolant fluid branch 64 for circulating coolant 12 to regulate a temperature of a high temperature component 74 disposed in the second coolant fluid branch 64. In this example, the high temperature component is a brake resistor 174.

The low temperature component is a component having a maximum permissible temperature. The maximum permissible temperature generally refers to a maximum operating temperature of the component 72. Analogously, the high temperature component 74 refers to a component having another maximum permissible temperature. The maximum permissible temperature generally refers to a maximum operating temperature of the component 74. In addition, the maximum permissible temperature of the low temperature component 72 is lower than the maximum permissible temperature of the high temperature component 74.

In the following example, the low temperature component 72 is the fuel cell stack, whilst the high temperature component 74 is the brake resistor. Other examples of components and combinations of components may be readily conceivable for other systems. However, for ease of reference, the following description of one example embodiment of the disclosure will be described with the low temperature component 72 being the fuel cell stack and the high temperature component 74 being the brake resistor. Moreover, the fuel cell stack is a component that is more sensitive to high temperatures, and thus needs to be protected from high temperatures, such as the temperature level of the brake resistor during operation of the vehicle. That is, during operation of the vehicle, the temperature in the brake resistor may increase to a relatively high temperature level due to heat generated from a braking event of the vehicle.

Hence, as illustrated in FIG. 2, the temperature of the coolant entering the low temperature component 72 is $x\,°$ C. and exits at $x+\Delta x°$ C. The rise in temperature $\Delta x$ is due to the heat extracted from the component. Similarly, the temperature of the coolant entering the high temperature component 72 is $y°$ C. and exits at $y+\Delta y°$ C.

The cooling system 100 also comprises the first fluid pump unit 40 and the second fluid pump unit 50. The first fluid pump unit 40 is arranged downstream of the cooler 10 in the first coolant fluid branch 62. The first fluid pump unit 40 is also arranged in fluid communication with the cooler 10 and the low temperature component 72. Hence, the first fluid pump unit 40 is configured to direct coolant 12 to the low temperature component 72. The first fluid pump unit 40 is generally also arranged to control the flow rate and pressure of the coolant in the first coolant fluid branch 62 in response a control signal from a control unit 110.

By the arrangement of the cooler 10 in fluid communication with the first coolant fluid branch 62, the cooler 10 is configured to reduce the temperature of a portion of the coolant to a reduced temperature and to supply the portion of coolant by the first fluid pump unit 40 to the low temperature component 72 via the first coolant fluid branch 62.

In a similar vein, as depicted in FIG. 2, the second fluid pump unit 50 is arranged downstream of the cooler 10 in the second coolant fluid branch 64. The second fluid pump unit 50 is in fluid communication with the cooler 10 and the high temperature component 74. Hence, the second pump unit 50 is configured to direct coolant 12 to the high temperature component 74. The second pump unit 50 is generally also arranged to control the flow rate and pressure of the coolant in the second coolant fluid branch 64 in response a control signal from the control unit 110. By the arrangement of the cooler 10 in fluid communication with the second coolant fluid branch 64, cooler 10 is configured to reduce the temperature of a portion of the coolant to a reduced temperature and to supply the portion of coolant by the second fluid pump unit 50 to the high temperature component 74 via the second coolant fluid branch 64.

By arranging a separate pump unit in each one of the first branch and the second branch in the same cooling system, it becomes possible to control the coolant flow in each branch in an independent manner for the two branches 62, 64.

To this end, the cooler 10 is configured to reduce the temperature of a portion of the coolant to a reduced temperature and to supply the portion of coolant to the low temperature component via the first coolant fluid branch 62 of the fluid circuit, while the cooler is also configured to decrease the temperature of another portion of the coolant to the reduced temperature and to supply the portion of coolant to the high temperature component via the second coolant fluid branch 64 of the fluid circuit.

It may be noted that due to the location of the low temperature component and the high temperature component, the first and second coolant fluid branches may be denoted as low and high coolant fluid branches 62, 64, respectively.

Furthermore, as depicted in FIG. 2, the second (high temperature) coolant fluid branch 64 intersects with the first (low temperature) coolant fluid branch 62 at a fluid circuit position 68 of the fluid circuit 60. The fluid circuit position 68 is arranged downstream the low temperature component 72 so that coolant from the second coolant fluid branch 64 is allowed to blend with coolant from the first coolant fluid branch 62 before returning to the cooler 10 via a return flow path 65. By arranging the second coolant fluid branch 64 to intersect with the first coolant fluid branch 62 at the fluid circuit position 68 (a fluid circuit position that is downstream the low temperature component), the first coolant branch 62 and second coolant branch 64 are both arranged to intersect into the return flow path 65 at a common point (location) 68 of the fluid circuit 60. In this manner, the coolant in the cooling fluid circuit can reject more heat to the ambient environment at the cooler 10 due to the increased temperature generated from the high temperature component 74. The return flow path 65 is here an integral part of the fluid circuit 60. In addition, the return flow 65 is here in fluid communication with the branch 62 and the branch 64 by means of a valve arrangement 94 at the fluid circuit position 68. The valve arrangement 94 is here a so-called three-way valve. The valve arrangement 94 is configured to control the flow from the first and second coolant fluid branches 62 and 64 to the cooler 10 via the return flow path 65 such that coolant from the second coolant fluid branch 64 blends with coolant from the first coolant fluid branch 62 before the coolant returns to the cooler 10 via the return flow path 65. It should be noted that the cooling system 100 may be provided without the valve arrangement 94. Hence the valve arrangement 94 is an optional component of the cooling system 100. The intersection or junction can e.g. be provided by a design of the branches 62 and 64 so that the branches intersect into the return flow path 65. The actual distribution between the branches 62 and 64 may e.g. be provided by the vale 92, as mentioned above.

Turning again to FIG. 2 and the first coolant fluid branch 62. As mentioned above, the first coolant fluid branch 62 corresponds to a low temperature fluid branch for regulating the temperature of a low temperature component 72 in the form of the fuel cell stack. As depicted in FIG. 2, the cooling system 100 further comprises a coolant temperature control system 90 disposed in the first coolant fluid branch 62. The coolant temperature control system 90 is arranged in-between the first fluid pump unit 40 and the low temperature component 72, as illustrated in FIG. 2. The coolant temperature control system 90 is here in communication with the control unit 110.

Moreover, the coolant temperature control system 90 is configured to regulate a temperature of the coolant to the low temperature component 72. In particular, the coolant temperature control system 90 is configured to regulate the temperature of the coolant to the low temperature component 72 on the basis of a temperature difference between a coolant temperature upstream the coolant temperature control system 90 and a temperature required at an inlet 72a of the low temperature component 72. The inlet 72a is here the inlet of the coolant inlet of the fuel cell stack 72. The low temperature component 72 also has an outlet 72b, which here corresponds to the outlet of the fuel cell stack 72.

The coolant temperature upstream (before) the coolant temperature control system 90 is here also y ° C., while the required temperature at the inlet 72 of the low temperature component here corresponds to x ° C.

The temperature upstream the coolant temperature control system 90 can be determined in several manners. In FIG. 2, the coolant temperature is measured by a temperature sensor 42. Thus, the first coolant fluid circuit 62 comprises the temperature sensor 42. The the temperature sensor 42 is here arranged in-between the cooler 10 and the coolant temperature control system 90. In addition, the temperature sensor is arranged downstream the first fluid pump unit 40, as illustrated in FIG. 2. The temperature sensor 42 is here in communication with the control unit 110 and configured to transmit temperature data of the coolant to the control unit 110.

In FIG. 2, the coolant temperature upstream the coolant temperature control system 90 is measured downstream the pump unit 40. Accordingly, in this example, the coolant temperature is measured upstream the coolant temperature control system 90 but downstream the pump unit 40. The coolant temperature is thus measured in the fluid circuit 62 in between the coolant temperature control system 90 and the first fluid pump unit 40. However, it may also be possible to measure the coolant temperature upstream the first fluid pump unit 40 in the fluid circuit 62.

The temperature required at the inlet 72a of the low temperature component 72 is generally defined by the operational characteristics of the low temperature component 72. By way of example, if the low temperature component 72 is a fuel cell stack, the temperature required at the inlet 72a is dictated by the calibration of the fuel cell system and the fuel cell stack. Therefore, the temperature required at the inlet 72a of the low temperature component 72 can be determined from temperature data received and/or stored in the control unit 110. Such temperature data can be received from previous operation of the fuel cell stack and from previous operation of a similar fuel cell stack. In addition, or alternatively, a value of the temperature required at the inlet 72a of the low temperature component 72 is received from a look-up table that is stored in a memory of the control unit 110. One reason for determining the temperature of the coolant that is required at the inlet 72a of the low temperature component 72 is to allow for an efficient regulation of the coolant temperature on the basis of the needed cooling of the fuel cell stack 72.

Optionally, the temperature at the inlet 72a may be monitored by a corresponding temperature sensor (not illustrated).

By determining the temperature of the supplied coolant that is upstream the coolant temperature control system 90 and the temperature of the coolant that is required at the inlet 72a of the low temperature component 72, the coolant temperature control system 90 can determine a needed temperature difference, also denoted as the delta temperature, for controlling the coolant temperature in the first fluid blanch 62 so as to maintain the temperature of the fuel cell stack 72 at a safe level during operation of the vehicle. Hence, the coolant temperature control system 90 is arranged and configured to regulate and supply coolant to the fuel cell stack 72 so as to maintain the temperature in the fuel cell stack 72 at a safe level during operation of the vehicle. The temperature difference can be determined in various way by the coolant temperature control system 90. The coolant temperature control system 90 may e.g. receive a control signal from the control unit 110 containing data and a value of the determined temperature difference. In addition, or alternatively, the coolant temperature control system 90 comprises its own processing circuitry, wherein the coolant temperature control system 90 receives data from the control unit 110 and the temperature sensors 42 and subsequently determine the temperature difference, as defined above. In addition, or alternatively, the control unit 110 is configured to determine the temperature difference between the coolant temperature upstream the coolant temperature control system and the temperature required at the inlet of the low temperature component, and then transfer the value of the determined temperature difference to the coolant temperature control system 90.

Figure 3:
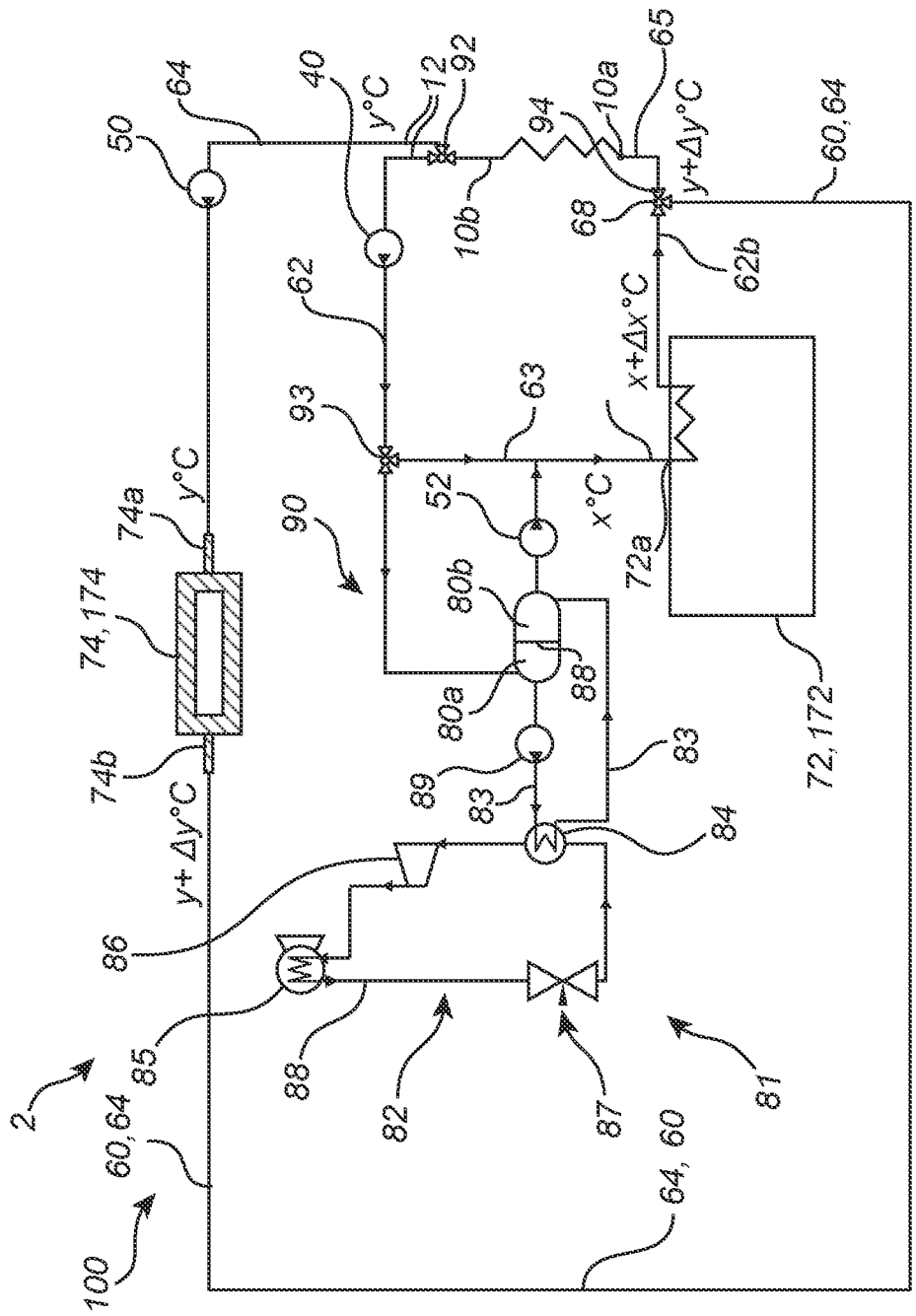
FIG. 3 schematically illustrates parts of a vehicle system comprising a cooling system according to another example embodiment of the present disclosure, in which the cooling system can be incorporated in the vehicle illustrated in FIG. 1.
Figure 4:
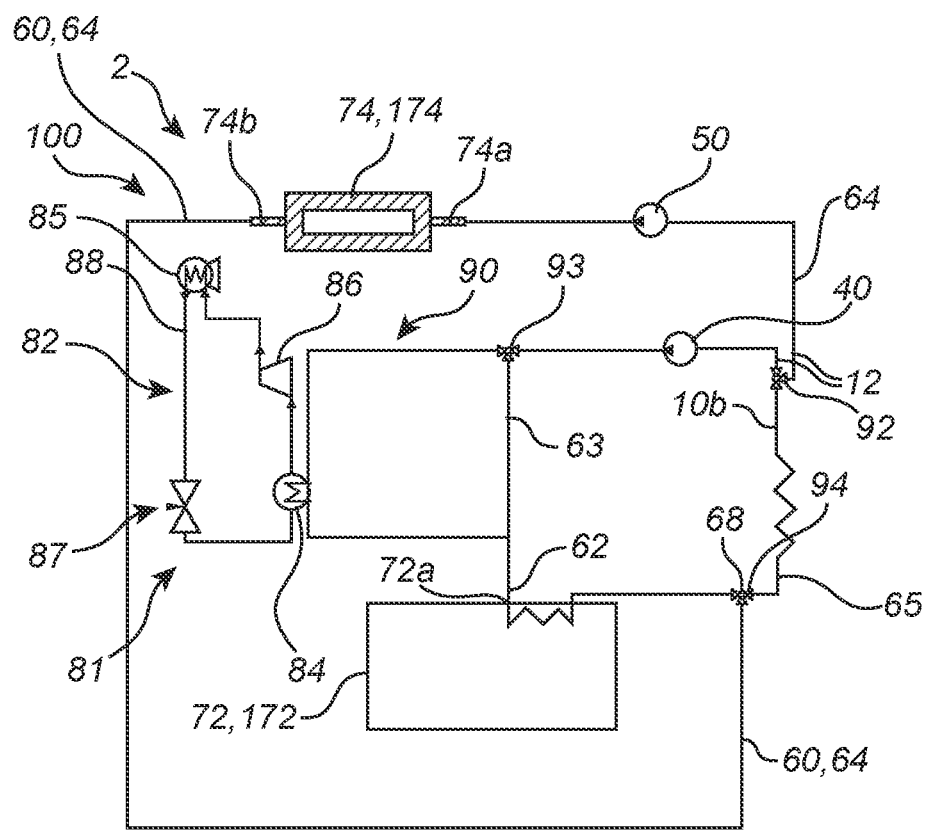
FIG. 4 schematically illustrates parts of a vehicle system comprising a cooling system according to another example embodiment of the present disclosure, in which the cooling system can be incorporated in the vehicle illustrated in FIG. 1.
Figure 5:
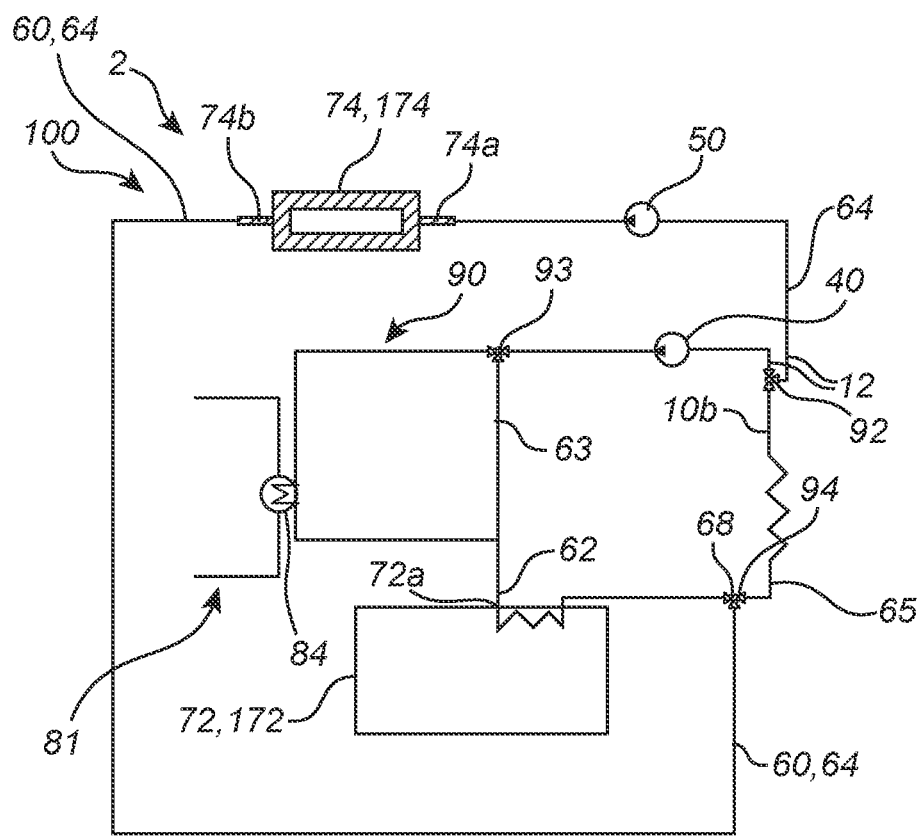
FIG. 5 schematically illustrates parts of a vehicle system comprising a cooling system according to yet another example embodiment of the present disclosure, in which the cooling system can be incorporated in the vehicle illustrated in FIG. 1.

The coolant temperature control system 90 can be provided in several different manners. FIG. 2 illustrates one example of the components of the coolant temperature control system 90. FIGS. 3 to 5 illustrate additional examples of a coolant temperature control system according that can be installed and arranged in the system 2, the cooling system 100 and in the vehicle 1, as described above.

Turning to FIG. 2, the coolant temperature control system 90 can be arranged to regulate the coolant to regulate the temperature of the coolant to the low temperature component 72 by means of a coolant buffer tank 80. The coolant buffer tank 80 is adapted to store coolant and arranged to supply coolant to the low temperature component 72.

The coolant buffer tank 80 is here arranged and configured to regulate the temperature of the coolant to the low temperature component 72 such that the temperature of the coolant supplied to the low temperature component 72 is sufficiently low so as to maintain the temperature of the low temperature component at a safe level during operation of the vehicle. This is provided by means of the coolant temperature control system 90 comprising the coolant buffer tank 80, in which the coolant temperature is regulated based on the temperature difference between the determined coolant temperature upstream the coolant temperature control system 90 and the determined temperature of the coolant entering the low temperature component 72, as described above. Thereby, it becomes possible to supply coolant to the low temperature component 72 so as to maintain the temperature at a safe level during operation of the vehicle.

As mentioned above, the temperature of the coolant entering the low temperature component 72 is x ° C. and exits at x+Δx° C. The rise in temperature Δx is due to the heat extracted from the component. Similarly, the temperature of the coolant entering the high temperature component 72 is y° C. and exits at y+Δy° C.

Moreover, the temperature of coolant stored in the coolant buffer tank 80 is here at a lower temperature then temperature level x. As the temperature before the first fluid pump 40 is also y° C., the third fluid pump unit 52 is arranged to direct the cold coolant from the coolant buffer tank 80 to the low temperature component 72. In this manner, the coolant temperature control system 90 is controlled so as to provide coolant with a temperature entering the low temperature component 72 down to x ° C. Since the temperature of the coolant in the coolant buffer tank is generally already known and the temperature after the pump 40 is determined as mentioned above, the cooling system in FIG. 3 allows for a simple yet efficient control by simply controlling the pump 52 to provide the required flow.

In the arrangement of the low and high temperature components 72 and 74, which herein are provided in the form of the fuel cell stack and the brake resistor, the delta temperature difference between y and x may be about 20 to 25 degrees C. This amount of temperature difference between the two components is desirable in order to provide an efficient control of the system and the temperature regulations in the system. In addition, this level of temperature difference may contribute to relatively reliable arrangement in terms of cooling and heat rejection. However, the desired temperature difference may differ for different types of systems and components and for maximum heat rejection it may generally be more beneficial to have system in which there is as a high temperature as possible in the fluid circuit. However, the maximum temperature difference may generally also need to be considered in view of the component requirements (e.g. the max permissible temperature) and sometimes also in view of the coolant itself to avoid a boiling incident of the coolant. It may thus be noted that the delta temperature between x and y may be greater than 10 degrees C. Still preferably, the delta temperature between x and y may be greater than 15 degrees. Still preferably, the delta temperature between x and y may be greater than 25 degrees.

By way of example, assuming that the supply of coolant to the first coolant fluid branch 62 is supplied at a flow rate of 100l/min at 80 deg C. Hence, the temperature upstream the first fluid pump 40 is 80 degrees C. In addition, the coolant storage tank 80 contains coolant with a temperature of 30 degrees C. Further assuming that the vehicle is operated in a manner such that the cooling system 100 needs to supply coolant to the inlet 72a of the fuel cell stack with a coolant temperature of 70 degrees C. In other words, the cooling system 100 is arranged to supply 80 l/min through path 63 and the remaining of coolant to the coolant buffer tank 80. In other words, 100 l/min coolant is supplied from the fluid pump 40 and at the controllable selection valve 93, the coolant flow is distributed by controlling the controllable selection valve 93 such that 80l/min flows in the circuit 63, while 20 l/min flows through the pump 52. At the same time, the cooling system 100 is controlled so that coolant is supplied at a flow rate of 20 l/min of 30 degrees C. coolant to the intersection point 68. The net result of supplying 100 l/min at 80 degrees C. to the fluid pump 40 and supplying 20/l min at 30 degrees C. to the intersection 68 would be 100/l min at 70 degrees C.

In the coolant temperature control system 90 in FIG. 2, the coolant temperature control system 90 further comprises a controllable selection valve 93 in fluid communication with the first pump unit 40 and configured to selectively regulate the flow of coolant to the low temperature component 72 via a primary fluid flow path 63 or to a coolant buffer tank 80 disposed in a secondary fluid flow path 67. The primary fluid flow path 63 and the secondary fluid flow path 67 are adapted to contain and supply coolant in a similar vein as the first coolant fluid branch 62. The primary flow path 63 and the secondary flow path 67 are parts of the first coolant fluid branch 62. In particular, as depicted in FIG. 2, the coolant temperature control system 90 comprises the coolant buffer tank 80. Further, the first coolant fluid branch comprises the primary flow path 63 and the secondary flow path 67. The primary flow path 63 and the secondary flow path 67 form a parallel flow path arrangement, as can be gleaned from FIG. 2.

The coolant buffer tank 80 disposed in the secondary flow path is further arranged in fluid communication with the low temperature component 72. As such, the coolant buffer tank 80 is arranged downstream the cooler 10 and upstream the low temperature component 72, as depicted in FIG. 2.

Moreover, as illustrated in FIG. 2, the coolant buffer tank 80 is adapted to receive and store coolant from the first fluid pump 40. The coolant buffer tank 80 is further arranged to supply coolant to the low temperature component 72.

The controllable selection valve 93 is operable on the basis of the above temperature difference and a temperature of the coolant in the coolant buffer tank 80. The controllable selection valve 93 comprises a first inlet in fluid communication with the first pump unit 40, an outlet to the secondary flow path 67 and an outlet to the primary flow path 63. In one example, the controllable selection valve 93 is provided in the form of a three-way valve. The type of three-way valve should be selected in view of the system configuration. The controllable selection valve 93 is controlled by the control unit 110.

Generally, the flow rate of coolant entering the coolant buffer tank 80 and exiting the coolant buffer tank 80 is the same so as to maintain the same volume of the coolant in the fluid circuit 60. Therefore, the control of the controllable selection valve 93 should here be based on the temperature of the coolant upstream the controllable selection valve 93, the temperature of the coolant in the coolant buffer tank 80 and the temperature required at the inlet 72a of the low temperature component 72.

The first coolant fluid branch 62, and thus the cooling system 100, here comprises a third pump unit 52 arranged downstream the coolant buffer tank 80 in the secondary flow path 67. The third pump unit 52 is configured to direct coolant from the coolant buffer tank 80 to the low temperature component. Thus, the third pump unit 52 is in fluid communication with the coolant buffer tank 80 and the low temperature component 72.

In the example embodiment in FIG. 2, the coolant temperature control system 90 is also adapted to control a temperature of the stored coolant in the coolant buffer tank 80 to a lower temperature than the temperature of the coolant upstream the coolant temperature control system 90.

Further, the temperature of the stored coolant in the coolant buffer tank 80 is here regulated by an auxiliary coolant system 81 comprising a refrigeration circuit 82 and a secondary heat exchanger 84 in fluid communication with the coolant buffer tank 80, as illustrated in FIG. 3.

FIG. 3 depicts a coolant system 81 for lowering the temperature of the coolant received to and stored in the coolant buffer tank 80. In this example, the coolant buffer tank 80 comprises first and second coolant storage volumes 80*a*, 80*b*. The coolant buffer tank 80 further comprises a movable separator 88 arranged to separate the first storage volume 80*a* from the second storage volume 80*b* in the coolant buffer tank 80, as illustrated in FIG. 3. By way of example, the movable separator is thermally insulated to minimize heat transfer between the two volumes. Also the entire coolant buffer tank is preferably thermally insulated.

As an example, when coolant is collected in the second volume 80*b*, the separator moves towards the first volume 80*a* (i.e. left in FIG. 3) so that the volume of the second volume 80*b* increases while coolant is discharged from the first volume 80*a* as its volume decreases at a rate corresponding to the increase of the volume of the second volume 80*b*.

The first storage volume 80*a* is in fluid communication with the second storage volume 80*b* via a coolant flow line 83. Hence, the coolant temperature control system 90 comprises the coolant buffer tank 80 having the first and second coolant storage volumes 80*a*, 80*b* and further the coolant flow line 83. In addition, as depicted in FIG. 3, the coolant temperature control system 90 comprises the secondary heat exchanger 84 disposed in the coolant flow line 83 and further arranged in-between the first and second coolant storage volumes 80*a*, 80*b*.

The coolant system 81 further comprises a fourth pump unit 89 configured to direct coolant from the first coolant storage volume 80*a* towards and through the secondary heat exchanger 84 and further towards the second coolant storage volume 80*b*.

The secondary heat exchanger 84 is arranged and configured to cool the coolant received from the first coolant storage volume 80*a*. The heat exchanger 84 is in fluid communication with the coolant on one side and in fluid communication with the refrigeration/air conditioning circuit 82 on the other side. The refrigerant is typically provided in vapor form in the tubes of the heat exchanger 84 and then the coolant can flow over these tubes. The type of heat exchanger 84 should further be selected in view of the overall system configuration. In this example, the refrigeration/air conditioning circuit 82 comprises a compressor 86, a condenser 85, and an expansion valve 87. The compressor 86, condenser 85, and the expansion valve 87 are disposed in the refrigeration/air conditioning circuit 82, as depicted in FIG. 3.

By the above arrangement, the secondary heat exchanger 84 is arranged and configured to cool the coolant received from first storage volume 80*a* by means of the refrigeration/air conditioning circuit 82. The refrigeration/air conditioning circuit 82 contains a fluid medium such as air that is allowed to recirculate in a part of the heat exchanger, according to a conventional heat exchanger.

It should be further noted that the first coolant storage volume 80*a* is arranged upstream the heat exchanger 84 so as to allow collection, storing and discharge of coolant before it reaches the secondary heat exchanger 84 and the second coolant storage volume 80*b* is arranged downstream of the heat exchanger 84 so as to allow collection, storing and discharge of coolant that has passed through and been cooled in the heat exchanger 84.

It should be noted that the coolant temperature control system 90 can be configured in other ways than the system in FIG. 3, as will be described herein in FIGS. 4 and 5.

Turning now again to FIG. 2, the cooling system 100 here further comprises a controllable first valve arrangement 92 disposed downstream the cooler 10 for controlling the supply of coolant in the fluid circuit 60 to the first and second coolant fluid branches 62, 64. By way of example, an outlet 10*b* of the cooler 10 is adapted to be in fluid communication with an inlet 62*a* of the first coolant fluid branch 62 and an inlet 64*a* of the second coolant fluid branch 64 by means of the first valve arrangement 92. By way of example, the first valve arrangement 92 is a three-way valve, as is commonly known in the art.

As mentioned above, the cooling system 100 here also comprises the controllable second valve arrangement 94 disposed upstream the cooler 10 for controlling the return of coolant from the first and second coolant fluid branches 62, 64 to the cooler 10. By way of example, an inlet 10*a* of the cooler is adapted to be in fluid communication with an outlet 62*b* of the first coolant fluid branch 62 and an outlet 64*b* of the second coolant fluid branch 64 by means of the second valve arrangement 94. By way of example, the second valve arrangement 94 is a three-way valve, as is commonly known in the art.

In FIG. 4, there is provided an example of the coolant temperature control system 90 without the coolant buffer tank 80. In this example, the coolant temperature control system 90 is configured to regulate the temperature of the coolant to the low temperature component by means of the refrigeration/air conditioning circuit 82. The refrigeration/air conditioning circuit 82 comprises the compressor 86, condenser 85, and the expansion valve 87. Accordingly, the coolant system 81 is here provided in the form of the refrigeration/air conditioning circuit 82, which is arranged to lower the temperature of the coolant in the secondary flow path 67.

The refrigeration/air conditioning circuit 82 is in fluid communication with the secondary flow path 67. Hence, the refrigeration/air conditioning circuit 82 is in direct fluid communication with the low temperature component 72.

Turning now to FIG. 5, there is provided another example of the coolant temperature control system 90 without the coolant buffer tank 80. In this example, the coolant temperature control system 90 is configured to regulate the temperature of the coolant to the low temperature component by means of the secondary heat exchanger 84. The secondary heat exchanger may e.g. be in fluid communication with ambient air. Accordingly, the coolant system 81 is here provided in the form of the secondary heat exchanger 84, which is arranged to lower the temperature of the coolant in the secondary flow path 67.

The secondary heat exchanger 84 is in fluid communication with the secondary flow path 67. Hence, the secondary heat exchanger 84 is in direct fluid communication with the low temperature component 72.

In FIGS. 3 to 5, the temperature difference between the coolant temperature upstream the coolant temperature control system and the temperature required at an inlet of the low temperature component can be determined in a similar vein as described in relation to FIG. 2. Hence, although not shown in FIGS. 3 to 5, the first coolant fluid branch 62 may likewise comprise the temperature sensor 42, as illustrated in FIG. 2.

It should be noted that although the FIGS. 2 to 5 have been described in relation to the fuel cell stack and the brake resistor, however, the temperature components may in other examples be different. By way of example, in one example embodiment (not illustrated), the low temperature component is an electric machine and the high temperature component is the fuel cell stack.

As mentioned above, the cooling system 100 in FIGS. 2 to 5 also comprises the control unit 110 in communication with the coolant temperature control system 90. The control unit comprises a processing circuitry (not shown) for operating the coolant temperature control system. The control unit 110 is generally also in communication with the coolant system 100 and its integral components, as described above. As such, the control unit 110 is adapted to control the coolant system and coolant temperature control system 90. By way of example, the control unit 110 is adapted to control the temperature of the coolant to the temperature components 72 and 74, and any other component in the coolant system, on the basis of the determined temperature and temperature difference, as mentioned above. The control unit 110 may also communicate with the controllable valves 92, 93, 94 as well as 87 so as to control the flow of coolant in the fluid circuit 60 and its branches 62, 64 by operating the corresponding valves. By way of example, the control unit 110 is adapted to control the valve 93 to selectively direct the flow of fluid to the coolant storage tank and the directly to the low temperature component.

The coolant 12, in the example embodiments described herein, is a liquid fluid medium. Accordingly, the term "fluid" in the context of these example embodiments refers to a liquid fluid. The type of coolant may, however, vary depending on type of vehicle and type of installation. Typically, the coolant is water-based. By way of example, the coolant is water-based with the addition of glycols to prevent freezing and other additives to limit corrosion, erosion and cavitation etc. The liquid coolant may accordingly be water blended with ethylene glycol, ammonia, or any other suitable liquid coolant. The coolant may also be an oil, or a combination of oil and a water-based fluid. In another example, the coolant may be a fluid such as a gas. In other words, in this example, it should be noted that the system also comprises the coolant. In addition, the coolant in this example is contained in the fluid circuit 60. Accordingly, in the fluid circuit 60, a liquid coolant is transportable, typically with the aid of pump units 40 and 50, as further described herein. Each one of the first and second pumps are arranged downstream the cooler 10. The cooler 10 is typically configured to discharge the heat to the ambient atmosphere so as to cool the coolant. The cooler 10 may be an air-to-coolant heat exchanger in which a fan is used to produce an air flow through the heat exchangers in order to cool the coolant.

It should be readily appreciated that the flow of coolant is in a direction from the cooler to the components 72, 74, and then in a direction from the components to the cooler, as indicated by the arrows in e.g. FIG. 2. It should be noted that in the context of the example embodiments, the terms "downstream" and "upstream", as used herein, are terms that indicate a direction relative to the flow of the coolant through the fluid circuit 60. As such, the term "downstream" refers to a direction that generally corresponds to the direction of the flow of coolant, and the term "upstream" generally refers to the direction that is opposite of the direction of flow of the coolant. By way of example, the term "downstream" refers to a direction that generally corresponds to the direction of the flow of coolant from the cooler, and the term "upstream" generally refers to the direction that is opposite of the direction of flow of the coolant from the cooler. The direction of flow of the coolant is indicated with arrows in e.g. FIGS. 2 to 3.

The fluid pumps may be electrically driven and/or driven by a belt or hydraulically by another machine in the vehicle. Liquid coolant is thus transported by the pumps to the vehicle components, respectively, as described herein.

Typically, although strictly necessary, the cooling system 100 may comprise an expansion device (not shown) to allow the coolant to expand with rising temperature and pressure. The expansion device is in fluid communication with the fluid circuit 60 and may be disposed in any one of the coolant fluid branches 62 and 64. The use, positioning and the selection of the expansion tank should be adapted in view of the system configuration.

It should be noted that the system and/or the cooling system may include a number of temperature components disposed in additional coolant fluid branches, and thus not only two temperature components.

It is to be understood that the present disclosure is not limited to the embodiments described above and illustrated in the drawings; rather, the skilled person will recognize that many changes and modifications may be made within the scope of the appended claims.

The invention claimed is:

1. A cooling system for a vehicle, said cooling system comprising a fluid circuit configured to define a fluid passageway for circulating a coolant there through and a cooler arranged in fluid communication with said fluid circuit, said cooler being configured to regulate the temperature of said coolant, wherein said fluid circuit comprises a first coolant fluid branch for circulating said coolant to regulate a temperature of a low temperature component disposed in said first coolant fluid branch and a second coolant fluid branch for circulating said coolant to regulate a temperature of a high temperature component disposed in said second coolant fluid branch;

wherein said cooling system further comprises:
a first pump unit arranged in said first coolant fluid branch and in fluid communication with said cooler and said low temperature component;
a coolant temperature control system disposed in said first coolant fluid branch and upstream the low temperature component;
a temperature sensor arranged in said fluid circuit and upstream the coolant temperature control system in the first coolant fluid branch to measure coolant temperature, wherein said coolant temperature control system is configured to regulate a temperature of the coolant to the low temperature component on the basis of a temperature difference between the coolant temperature upstream the coolant temperature control system and a temperature required at an inlet of the low temperature component;
a control unit in communication with the coolant temperature control system, said control unit comprising a processing circuitry for operating the coolant temperature control system, the control unit being configured to determine the temperature difference between the coolant temperature upstream the coolant temperature control system and the temperature required at the inlet of the low temperature component;
a second pump unit arranged in said second coolant fluid branch and in fluid communication with said cooler and said high temperature component, said second pump unit being configured to direct said coolant to said high temperature component;
wherein the second coolant fluid branch intersects with the first coolant fluid branch at a fluid circuit position downstream the low temperature component so that coolant from the second coolant fluid branch is allowed to blend with coolant from the first coolant fluid branch before returning to the cooler via a return flow path; and a controllable first valve arrangement disposed downstream the cooler for controlling the supply of coolant in the fluid circuit to the first and second coolant fluid branches, and wherein an outlet of the cooler is adapted to be in fluid communication with an inlet of the first coolant fluid branch and inlet of the second fluid branch by means of the first valve arrangement, wherein the first and second coolant branches split apart at the first valve arrangement.

2. The cooling system according to claim 1, wherein the coolant temperature control system comprises a controllable selection valve in fluid communication with the first pump unit and configured to selectively regulate the flow of coolant to the low temperature component via a primary flow path or to a coolant buffer tank disposed in a secondary flow path, said primary flow path and said secondary flow path forming a parallel flow path arrangement, and said coolant buffer tank being adapted to receive and store coolant and further arranged to supply coolant to the low temperature component, wherein said controllable selection valve is operable on the basis of said temperature difference and a temperature of the coolant in the coolant buffer tank.

3. The cooling system according claim 2, further comprising a third pump unit arranged downstream said coolant buffer tank in said secondary flow path, said third pump unit being configured to direct coolant from the coolant buffer tank to the low temperature component.

4. The cooling system according to claim 2, wherein the coolant temperature control system is adapted to control a temperature of the stored coolant in the coolant buffer tank to a lower temperature than the temperature of the coolant upstream the coolant temperature control system.

5. The cooling system according to claim 4, wherein the temperature of the stored coolant in the coolant buffer tank is regulated by any one of a refrigeration circuit and a secondary heat exchanger in fluid communication with the coolant buffer tank.

6. The cooling system according to claim 1, wherein the coolant temperature control system comprises any one of a refrigeration circuit and a secondary heat exchanger in direct fluid communication with the low temperature component.

7. The cooling system according to claim 1, further comprising a controllable second valve arrangement disposed upstream the cooler for controlling the return of coolant from the first and second coolant fluid branches to the cooler, and wherein an inlet of the cooler is adapted to be in fluid communication with an outlet of the first coolant fluid branch and an outlet of the second coolant fluid branch by means of the second valve arrangement.

8. The cooling system according to claim 1, wherein the high temperature component is any one of a brake resistor, a brake retarder configured to generate heat from a braking event, a fuel cell stack, and a fuel cell system.

9. The cooling system according to claim 1, wherein the low temperature component is any of a battery pack, an electric machine, a fuel cell stack, and an inverter.

10. The cooling system according to claim 7, wherein the low temperature component is an electric machine and the high temperature component is a fuel cell stack.

11. The cooling system according to claim 7, wherein the low temperature component is a fuel cell stack and the high temperature component is any one of a brake resistor and a brake retarder.

12. A vehicle comprising a cooling system according to claim 1.

* * * * *